United States Patent
Koppe

(10) Patent No.: US 9,631,282 B2
(45) Date of Patent: Apr. 25, 2017

(54) METHOD FOR DEPOSITING A NICKEL-METAL LAYER

(75) Inventor: Stefan Koppe, Kirchzarten (DE)

(73) Assignee: Schauenburg Ruhrkunststoff GmbH (DE)

( * ) Notice: Subject to any disclaimer, the term of this patent is extended or adjusted under 35 U.S.C. 154(b) by 504 days.

(21) Appl. No.: 13/807,732

(22) PCT Filed: Jun. 30, 2011

(86) PCT No.: PCT/EP2011/061073
§ 371 (c)(1),
(2), (4) Date: Apr. 17, 2013

(87) PCT Pub. No.: WO2012/001134
PCT Pub. Date: Jan. 5, 2012

(65) Prior Publication Data
US 2013/0202910 A1    Aug. 8, 2013

(30) Foreign Application Priority Data

Jun. 30, 2010 (DE) .................. 10 2010 025 684

(51) Int. Cl.
*C23C 28/02* (2006.01)
*C25D 3/56* (2006.01)
(Continued)

(52) U.S. Cl.
CPC ............ *C23C 28/021* (2013.01); *B01D 35/28* (2013.01); *B32B 15/018* (2013.01); *C22C 5/06* (2013.01); *C23C 18/1644* (2013.01); *C23C 18/1671* (2013.01); *C23C 18/34* (2013.01); *C23C 18/50* (2013.01); *C25D 3/22* (2013.01); *C25D 3/562* (2013.01); *C25D 5/18* (2013.01); *C25D 5/34* (2013.01); *C25D 7/04* (2013.01);
(Continued)

(58) Field of Classification Search
CPC .. C25D 3/12; C25D 3/562; C25D 3/56; C23C 20/021; C23C 28/023
USPC ................. 205/255, 271, 184, 187
See application file for complete search history.

(56) References Cited

U.S. PATENT DOCUMENTS 3,303,111 A    2/1967  Peach
3,485,725 A    12/1969  Koretzky
(Continued)

FOREIGN PATENT DOCUMENTS

DE    1521043 A1    7/1969
FR    2 825 721 A1    12/2002
(Continued)

OTHER PUBLICATIONS

Sun et al., "Combination Coating of Electroless Plating Ni—P and Pulse Plating Zn—Ni on Magnesium Alloy", Diandu Yu Jingshi (May 2010), vol. 32, No. 5, pp. 4-7 and 11.*
(Continued)

*Primary Examiner* — Edna Wong
(74) *Attorney, Agent, or Firm* — Fish & Tsang LLP

(57) ABSTRACT

A method for depositing nickel-metal layers for colouring surfaces, and a bath for depositing such a layer. This is made possible by depositing a nickel-metal layer from a bath for the electroless deposition of nickel which contains at least one further metal compound, a voltage being additionally applied enable the metal of the metal compound to be incorporated while forming a nickel-metal layer.

11 Claims, 1 Drawing Sheet

(51) Int. Cl.

| | |
|---|---|
| *C25D 3/12* | (2006.01) |
| *C23C 18/16* | (2006.01) |
| *C23C 18/50* | (2006.01) |
| *C25D 5/18* | (2006.01) |
| *C25D 5/34* | (2006.01) |
| *C23C 18/34* | (2006.01) |
| *C25D 3/22* | (2006.01) |
| *C25D 7/04* | (2006.01) |
| *C25D 7/06* | (2006.01) |
| *B01D 35/28* | (2006.01) |
| *B32B 15/01* | (2006.01) |
| *C22C 5/06* | (2006.01) |

(52) U.S. Cl.
CPC ......... *C25D 7/06* (2013.01); *Y10T 428/12361* (2015.01); *Y10T 428/12444* (2015.01); *Y10T 428/12479* (2015.01); *Y10T 428/12792* (2015.01); *Y10T 428/12896* (2015.01)

(56) References Cited

U.S. PATENT DOCUMENTS

| | | | |
|---|---|---|---|
| 3,902,977 A | | 9/1975 | Greenspan |
| 4,131,519 A | | 12/1978 | Martinsons et al. |
| 4,463,060 A | | 7/1984 | Updegraff |
| 4,758,479 A | * | 7/1988 | Swathirajan et al. ........ 428/659 |
| 4,833,041 A | | 5/1989 | McComas |
| 5,019,163 A | | 5/1991 | McComas |
| 5,304,403 A | * | 4/1994 | Schlesinger ............ C23C 18/48 427/304 |
| 6,071,398 A | * | 6/2000 | Martin et al. ................ 205/103 |
| 2002/0153260 A1 | | 10/2002 | Egli et al. |
| 2003/0024822 A1 | | 2/2003 | Steinius |
| 2004/0050703 A1 | | 3/2004 | Lee et al. |
| 2006/0228569 A1 | | 10/2006 | Kojima et al. |
| 2008/0202922 A1 | | 8/2008 | Zhong et al. |
| 2009/0159451 A1 | * | 6/2009 | Tomantschger ......... C25D 1/00 205/96 |
| 2011/0056839 A1 | * | 3/2011 | Medina .................... C25D 5/08 205/176 |

FOREIGN PATENT DOCUMENTS

| | | |
|---|---|---|
| GB | 931638 A | 7/1963 |
| GB | 1222969 A | 2/1971 |

OTHER PUBLICATIONS

Alfantazi et al., "Pulse Plating of Zn—Ni Alloy Coatings," J. of Appl. Electrochem. (no month, 1996), vol. 26, pp. 1125-1234.*

Bapu et al.. "Electrodeposition of Zinc-Nickel Alloys," Metal Finishing (no month, 1997), vol. 85, No. 2, pp. 49-50. Abstratc Only.*

Mermerski et al., "Properties of Electrodeposited Zinc-Nickel Alloys," Ext. Abstr., Meet.—Int. Soc. Electrochem., 28th (no month, 1977), vol. 1, pp. 500-504. Abstract Only.*

Meuleman et al., "Transient Electrochemical Processes During Cu—Ni Deposition," Transactions of the Institute of Metal Finishing (no month, 2003), vol. 81, No. 2, pp. 55-58.*

Nie et al., "Corrosion Resistance of Alternatively Deposited Layers of Electroless Ni—P and Electroplated Zn—Ni on Cast Steel Substrate in Neutral 5 wt-%NaCl Solution," Corrosion Engineering, Science and Technology (no month, 2006), vol. 41, No. 1, pp. 51-56.*

Schmeling et al., "Electrochemical Studies of the Corrosion Behavior of Electrolytically and Electroless Deposited Metallic Coatings in Chloride-Containing Solutions," Werkstoffe and Korrosion (no month, 1973), vol. 24, No. 2, pp. 112-118.*

Sun et al., "Combination Coating of Electroless Plating Ni—P and Pulse Plating Zn—Ni on Magnesium Alloy," Diandu Yu Jingshi (no month, 2010), vol. 32, No. 5, pp. 4-7, 11.*

Marquez K et al: "In situ FTIR monitoring of Ag and Au electrodeposition on glassy carbon and Silicon", Electrochimica Acta, Elsevier Science Publishers, Barking, GB, Bd. 48, Nr. 6, Feb. 5, 2003 (Feb. 5, 2003), pp. 711-720, XP004405062, ISSN: 0013-4686, DOI: 10.1016/S0013-4686(02)00740-5.

* cited by examiner

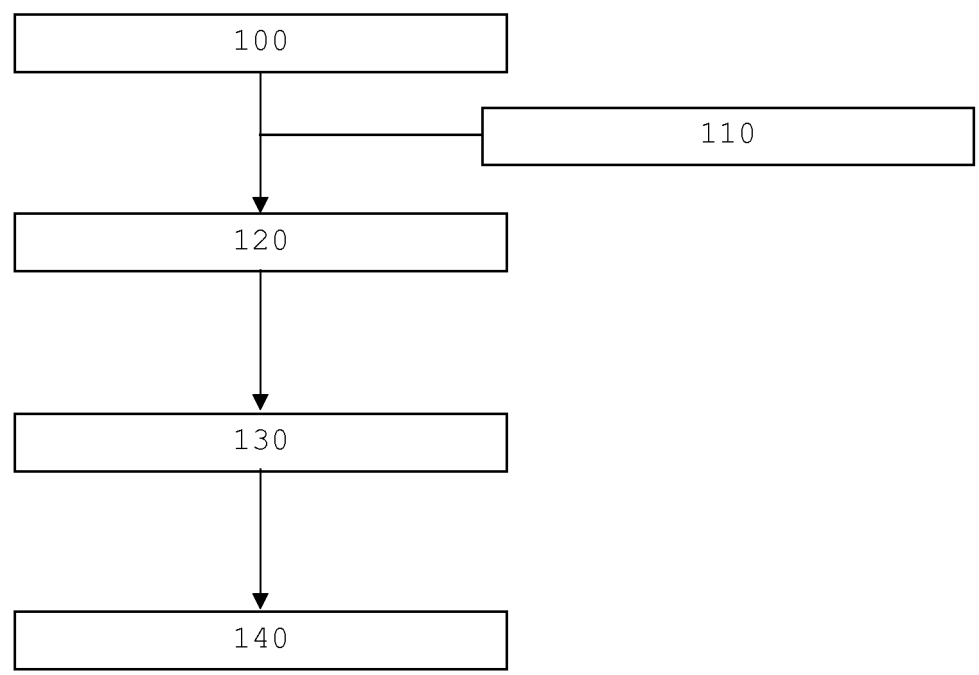

METHOD FOR DEPOSITING A NICKEL-METAL LAYER

FIELD OF THE INVENTION

The invention relates to a method for depositing a nickel-metal layer for coloring surfaces, and a bath for depositing such a layer.

PRIOR ART

Techniques for altering the color of metallic surfaces (coloring) have long been known from the prior art. Generally the surfaces are treated with chemical solutions. Coloring can also be carried out by an electrolytic process.

Thus, several methods of coloring are known for example for nickel surfaces, which can be produced by electrodeposition or electrolytically. For chemical coloring it is possible to treat the surface with oxidizing solutions such as nitric acid or nitrates. In this case nickel oxide layer forms on the surface.

The document US 2006/0228569 A1 describes a multi-step method, which envisages black coloring of electroless deposited nickel layers by treatment with nitrate solutions.

In the area of electroplating processes, blackening of nickel surfaces electrolytically with nickel sulfide or nickel thiocyanate solutions is known. The document U.S. Pat. No. 2,844,530 describes an electrolytic process for blackening nickel layers. For this purpose, an electrolytic bath with nickel chloride, sodium thiocyanate and zinc chloride is used and a further layer is deposited at room temperature. These methods make use of the reduction of sodium thiocyanate and the formation of black nickel sulfide.

In addition there are zinc-nickel layers, i.e. layers with high zinc content (>80 wt %), which for example can be colored black using post-dip solutions. However, these layers are not resistant to hydrochloric acid, but show a color loss on corrosion, which can be attributed to the (intentional) formation of zinc oxide. The zinc-nickel layer is used as a corrosion-protection layer, as a so-called "sacrificial layer".

In addition, in the area of electroless deposited nickel layers it is known that a black coloration of electroless deposited nickel layers, i.e. nickel/phosphorus layers, can be achieved with oxidizing solutions, e.g. with toxic chromates.

However, such layers are not acid-resistant and they also have undesirable properties relating to their adhesiveness. In addition, the constituents of the solutions are toxic. Furthermore, the layers are sensitive to mechanical action.

The methods in the prior art also have the disadvantage that, for example in the case of coated objects, the coloring must take place in a separate bath, as the composition of the coloring bath is incompatible with the deposition bath or the deposition conditions, e.g. elevated temperature.

In the case of electroplating processes, a further drawback is that these methods are limited with respect to the surface to be colored (or to be coated). Thus, with electroplating processes it is not possible for fine structures, cavities, netting or wire cloth to be coated uniformly, because in this case, due to screening effects in the internal space, there is no field for deposition.

It is known from the document GB 1 222 969 A that a voltage can be applied to baths for electroless deposition, to support the deposition of the electroless deposited metal. No alloys are deposited.

OBJECT OF THE INVENTION

The problem to be solved by the invention is that of providing a method that avoids the disadvantages of the prior art and makes it possible to achieve coloring of metal layers simply and economically.

SUMMARY OF THE INVENTION

This problem is solved by the inventions with the features of the independent claims. Advantageous variants of the inventions are characterized in the subclaims. The wording of all claims is herewith incorporated by reference to the contents of this description. The invention also comprises all sensible and especially all stated combinations of independent and/or dependent claims.

The problem is solved by a method for depositing a nickel-metal layer that comprises the following steps:
a) providing a nickel bath for electroless deposition of a nickel layer, wherein the bath additionally contains a compound of another metal;
b) depositing a nickel-metal layer by simultaneous
   b1) deposition of nickel from the nickel bath and
   b2) voltage-supported deposition of the other metal compound from the bath provided.

Individual steps of the method are described in more detail below. The method to be described can also have other steps that are not mentioned.

In a first step, first an aqueous, chemical nickel bath with a nickel content in a range from 1 to 15 g/l and a content of reducing agent in a range from 20 to 50 g/l is provided, this bath is stirred well and then the pH is adjusted to a value in the range from 3.0 to 5.0, preferably in the range from 3.8 to 4.2.

The substrate used is for example a substrate of steel, aluminum, copper, brass, aluminum alloys, titanium, titanium alloys, iron, magnesium, magnesium alloys, nickel, nickel alloys, bronze or stainless steel, wherein stainless steel is preferred.

However, it may also be a substrate of plastic, for example polyacrylates, polyimides, nylon, polyamides, polyethylene or polypropylene.

Depending on the substrate used, the surface of the substrate can be pretreated, for example by degreasing, pickling, e.g. with a solvent, lyes, acids, nickel strike or similar methods known to a person skilled in the art.

Thus, a nonconducting substrate can even be provided with a conductive layer, e.g. an electroless deposited nickel layer.

The nickel ions of the bath are available as a rule in the form of solutions of the salts nickel chloride, nickel sulfate, nickel carbonate and/or nickel acetate. The nickel content is usually in a range from 3 to 10 g/l.

A phosphorus or boron compound is preferably used as reducing agent in the bath. The reducing agent in the bath is especially preferably a hypophosphite. Quite especially preferably the reducing agent is sodium hypophosphite and/or potassium hypophosphite. Dimethylaminoborane, diethylaminoborane or sodium borohydride can be used as the boron compound. The reducing agent is usually present in the bath at a concentration in a range from 32 to 42 g/l.

Usually the bath also contains at least one complexing agent, which is selected in particular from the group monocarboxylic acids, dicarboxylic acids, hydroxycarboxylic acids, ammonia and alkanolamines. The complexing agent is as a rule present in the bath at a concentration in a range from 1 to 15 g/l. Complexing agents complex nickel ions and thus prevent excessively high concentrations of free nickel ions. As a result the solution is stabilized and the precipitation of for example nickel phosphite is suppressed.

The bath can also contain at least one accelerator, which in particular is selected from the group fluorides, borides or anions of mono- and dicarboxylic acids. The accelerator is usually present in the bath at a concentration in a range from 0.001 to 1 g/l. Accelerators can activate hypophosphite ions and thus accelerate deposition.

Ordinary nickel baths also contain at least one stabilizer, which is selected in particular from the group lead, tin, arsenic, molybdenum, cadmium, thallium ions and/or thiourea. The stabilizer is usually present in the bath at a concentration in a range from 0.01 to 250 mg/l. Stabilizers are used in order to prevent decomposition of the solution, by masking catalytically active reaction nuclei.

The bath also usually contains at least one pH buffer, which is in particular a sodium salt of a complexing agent and/or also the associated corresponding acid. The buffer is present in the bath at a concentration in a range from 0.5 to 30 g/l. By means of buffers, the pH can be kept constant for longer operating times.

The bath can also contain at least one pH-regulator, which in particular is selected from the group sulfuric acid, hydrochloric acid, sodium hydroxide, sodium carbonate and/or ammonia. The pH-regulator is usually present in the bath at a concentration in a range from 1 to 30 g/l. pH-regulators allow subsequent adjustment of the pH of the bath.

The bath can also contain at least one wetting agent, which is selected in particular from the group of ionogenic and/or non-ionogenic surfactants. The wetting agent is usually present in the bath at a concentration in a range from 0.001 to 1 g/l. Wetting agents increase the wettability of the surface to be nickel-coated with the electrolyte bath.

In a preferred embodiment the bath does not contain any thiocyanate ions or organic sulfur-containing compounds, which lead to the formation of nickel sulfide.

In addition, particles, especially polymer particles, can also be dispersed in the bath. These are preferably of fluoropolymers, quite especially preferably of polytetrafluoroethylene. These particles can be present at a concentration between 1 and 30 g/l. The average particle size is preferably in a range from 0.01 to 1 μm. For further functionalization of the resultant layer, functional particles can be incorporated in the layer to be produced in the form of a dispersion: for example PTFE for minimizing friction or SiC or other hard substances for increasing protection against wear, in the aforementioned proportions and particle sizes.

When particles are used in the bath, the layer obtained contains the codeposited particles. Preferably they are particles of hard material or polymer particles. The latter are preferably of fluoropolymers, especially preferably of polytetrafluoroethylene (PTFE) or perfluoroalkoxy alkane (PFA). These particles are usually present in the coating in a range from 1 to 30 wt %. The average particle size is preferably in a range from 0.01 to 1 μm.

Nickel layers in the sense of the invention are also layers that consist mainly of nickel. Depending on the reducing agent, they are nickel/phosphorus, nickel/boron or nickel/phosphorus/boron layers.

The layer thickness of the deposited nickel-metal layer is advantageously at most 100 μm, especially at most 20 μm, quite especially preferably at most 5 μm. The layer thickness can be controlled by means of the deposition time.

The bath additionally contains a compound of another metal. This metal compound can be the compound of a precious metal or base metal. Base metals are preferred, especially metals that have a lower redox potential than nickel (−0.49 V), for example Zn, Nb, V or Mn. The compound is usually a salt of the metal, which is soluble in the bath. Examples of anions are halides ($F^-$, $Cl^-$, $Br^-$, $I^-$), carbonate ions ($CO_3^{2-}$, $HCO_3^{2-}$) or sulfate ions ($SO_4^{2-}$)

In a preferred embodiment of the invention, the metal compound is a zinc compound. Zinc salts are especially preferred, such as zinc chloride, zinc carbonate or zinc sulfate.

Zinc compounds are especially preferred, as a deep black coloring of the surface can be achieved with them. The layer obtained is far superior to the layers obtained with post-dip solutions or black nickel solutions.

The layers obtained do not contain any nickel sulfide.

The layer obtained demonstrates electrical and thermal conductivity and is heat-resistant to above 250° C. In addition it is acid-resistant, in particular resistant to hydrochloric acid, and resistant to salt solutions. It can also be welded and soldered. Such layers cannot be obtained with a post-treatment with solutions.

The metal compound is added in such a way that a content between 0.05 mol/l and 0.5 mol/l, preferably between 0.07 mol/l and 0.3 mol/l, relative to the metal or the metal ions, is present in the bath.

In the case of $ZnCl_2$, a content between 10 and 40 g/l is preferred.

It is important that the bath used for voltage-supported, or voltage-assisted, or electrically supported deposition corresponds to a bath for electroless deposition of nickel layers, to which other metal salts have also been added. The metal salts can also be added just before electrolytic deposition.

In a variant of the invention, step b) is carried out at a temperature of above 50° C. As a result, during the voltage-supported deposition of the metal, the reaction of electroless deposition takes place in the background. This increases the adhesion and durability of the nickel-metal layer produced. Step b) is preferably carried out at a temperature between 80 and 95° C., preferably between 86° C. and 90° C., and especially preferably at 88° C.

Before the start of the electrically supported deposition of the nickel-metal layer, an electroless layer can also already be deposited on the substrate. For example, on a nonconducting substrate, first electroless deposition of a conductive layer can be carried out. If the electroless deposition already took place from the bath with the further metal compound, there may already be a slight incorporation of the additional metal in the electroless deposited nickel layer. In this case the auxiliary field is not switched on until after deposition is completed.

The deposition is electrically supported. This means that a voltage is applied between the workpiece to be coated and an electrode, so that an electric field is produced. As a rule the workpiece to be coated is connected as the cathode and the at least one electrode is connected as the anode. The at least one electrode can be shaped corresponding to the workpiece to be coated.

The electrode is preferably electrolytically insoluble, i.e. it does not consist of the metal of the metal compound. The preferred material of the electrode is graphite.

Due to the applied field, reduction of the other metal compound is intensified, or brought about, and as a result of the simultaneously occurring electroless deposition of the nickel layer, the reduced metal compound becomes incorporated into the nickel layer. The metal compound can be reduced both by the auxiliary field, and by the reducing agent present in the bath. Without being bound to a theory, it is presumed that the auxiliary field merely transports the metal ions of the metal compound to the substrate and in this way intensifies the incorporation of the reduced metal compound. A nickel/phosphorus/metal layer or a nickel/boron/metal layer is formed as a result.

The ratio of the area of the anode in the bath to the projected workpiece surface (shadow area) is preferably between 1:0.5 and 1:2, preferably 1:1 (+/−50%).

In a preferred embodiment, a current density between 0.01 and 5 $A/dm^2$, preferably between 0.1 and 3 $A/dm^2$, is used, relative to the projected workpiece surface.

In a preferred embodiment, in step b) the current density is altered continuously or increased in steps. As a rule this is done by changing the voltage. With increasing current density, more and more metal is codeposited. A gradient layer is formed. On reaching the desired deposition, the process is stopped. The increasing of the current density can also be carried out several times, beginning again at a minimum value after reaching the maximum value, for example as with a saw-tooth voltage. The maximum value is the current density stated above. The minimum value can be 0, but as a rule lies between 0.01 and 0.1 $A/dm^2$.

With increase of the electric field strength, the incorporation of the reduced metal in the deposited nickel layer increases. By varying the field strength, and preferably by successive dwell times on different voltage plateaux, it is possible to avoid the formation of islands, e.g. the formation of zinc local cells, and zinc supersaturation at the surface. Also, when using constant excessive current densities, irregularities may develop on the edges or corners due to the excessive local field strength. This is avoided by varying the current density.

The current density is preferably altered in steps, preferably in steps of 0.1 V to 5 V, preferably 0.5 V to 1 V. The respective dwell time per step is between 30 seconds and 15 minutes, wherein the time depends on the area to be coated, size of the substrate, geometry, structure and the arrangement of the substrate in the bath.

In addition to the metal compound, the bath can also contain other salts for increasing the conductivity (conducting salts). These salts are preferably salts of the alkali metals or alkaline-earth metals, such as lithium, sodium or potassium. Independently of this, the anions of the salts are selected from the group of anions containing halides ($F^-$, $Cl^-$, $Br^-$, $I^-$), carbonate ions ($CO_3^{2-}$, $HCO_3^{2-}$), hydroxide ions or sulfate ions ($SO_4^{2-}$). Examples of such salts are potassium salts, such as potassium chloride or potassium hydroxide, especially preferably potassium chloride.

The content of these conducting salts is preferably between 0.1 and 0.8 mol/l relative to the cation of the conducting salt, e.g. 0.1 to 0.8 mol/l potassium ions in the case of a potassium salt. 0.13 to 0.67 g/mol of conducting salt, or potassium ions, is preferred. For the example of potassium chloride, the content is between 10 and 50 g/l.

The coloring of the surfaces is determined essentially through the duration of the voltage-supported deposition. A duration of up to 60 minutes is preferred, preferably between 30 seconds and 20 minutes. The duration, like the dwell time, also depends on the area to be coated, size of the substrate, geometry, structure and the arrangement of the substrate in the bath. With smaller substrates the process time can also be less than 10 minutes.

In addition it may be necessary to move the substrates in the bath during deposition, or to stir the bath.

It was found, surprisingly, that it is possible to deposit a nickel-metal layer from a bath for electroless deposition through the combination of voltage-supported deposition by applying an auxiliary field.

This makes deposition possible on substrates that are not normally suitable for purely galvanic coloring. This could be explained in that owing to the simultaneously occurring electroless deposition and the conductive surface produced thereby, deposition also becomes possible on places that are not accessible to direct electrodeposition. This applies in particular to net-like structures or hollow bodies that contain net-like structures as parts of the walls, for example cylinders, rectangular parallelepipeds or tubes with perforated walls. With the method according to the invention it is possible to also color these structures on the inside of the hollow body. Preferably they are net-like structures with a mesh size of below 1 mm, preferably below 0.5 mm, especially preferably below 50 μm.

As the process can even be carried out in just one bath, it can be carried out economically and quickly. The layers produced are characterized by particular adhesion and durability.

The layers obtained are less rough than the colored nickel layers obtained chemically. Moreover, they are non-oxidic and are free of chromium compounds.

The invention further relates to an electroless nickel bath for coloring conductive surfaces, which in addition to the components of an electroless nickel bath contains at least one zinc compound. The composition of the bath preferably corresponds to the composition of the bath in step a). If a voltage is applied as described, deep-black layers can be obtained with the bath.

The invention further relates to a coated black substrate, which is coated with a nickel/phosphorus/zinc layer or nickel/boron/zinc layer. Preferably it is a nickel/phosphorus/zinc layer.

The coated substrate was obtained by the method described. The layer is black and resistant to hydrochloric acid. It is also electrically and thermally conductive and is heat-resistant to above 250° C. It can also be welded and soldered. The thickness of the layer is usually between 0.1 μm and 1 μm.

The layer contains 3 to 10 wt % phosphorus, and a ratio of nickel to zinc between 9:1 and 1:1, preferably 9:1 to 5:1 (in wt %).

Preferably the substrate is a substrate that cannot be coated with a purely galvanic process. These are in particular substrates that have internal surfaces, especially hollows, tubes or net-like structures. Preferably the substrate is a hollow body, which has walls partially or completely perforated by net-like structures. Net-like structures in the sense of the application are structures that have at least two surfaces, wherein each surface has a large number of openings, wherein each opening provides a passage to each of the other surfaces. The openings make up more than 50%, preferably more than 70% of the volume between the surfaces. They are for example nets, wire cloth or sponges. The nets, or net-like structures, preferably have a mesh size of below 1 mm, preferably below 0.5 mm, especially preferably below 50 μm. The net-forming wires are between 50 μm and 1000 μm thick, measured at their largest diameter.

The substrate can for example be a cylinder or rectangular parallelepiped, which is formed from a net. Such structures occur in particular in sieve or filter elements.

In another embodiment, the problem on which the invention is based is solved by using the coated substrate in the automobile sector, sanitary sector, for jewelry, or electrical goods. For example, the coated substrate is also used in an application selected from the group of valves, flow restrictors, architecture, decoration, machines and equipment for the chemical industry and finish in the electrical industry.

Further details and features can be derived from the following description of preferred exemplary embodiments in conjunction with the subclaims. The respective features may be implemented on their own or several in combination with one another. The possibilities for solving the problem are not limited to the exemplary embodiments. For example, statements of ranges always comprise all—unmentioned— intermediate values and all conceivable partial ranges.

The exemplary embodiments are illustrated schematically in the figures. Identical reference numbers in the individual figures designate identical or functionally identical elements or elements corresponding to one another with respect to their functions.

In the Drawing

FIG. 1 shows a schematic representation of a method according to the invention.

FIG. 1 shows a typical flow chart of a method according to the invention. In a first step, a bath is provided for electroless deposition of nickel (100). At least one compound of another metal, and optionally at least one conducting salt (110), are added to this bath. The compound of another metal is preferably a zinc compound, especially preferably a zinc salt, especially preferably zinc chloride. The conducting salt also optionally added is preferably a potassium salt, preferably potassium chloride. In this way a bath is obtained for deposition of a nickel-metal layer (120) in the sense of the invention.

The substrate is inserted in the bath. Then the bath is adjusted to the conditions for electroless deposition of nickel, i.e. especially temperature and pH are adjusted. Then a voltage is applied between the substrate and an electrode, which is already present or has been introduced into the bath, in order to cause voltage-supported deposition of the metal in the nickel layer (130). This results in formation of a nickel-metal layer (140).

EXAMPLE 32 g/l zinc chloride and 40 g/l potassium chloride were added to the nickel bath described at the beginning. The pH was adjusted to 4.0 with $H_2SO_4$. The bath was heated to 88° C. Chemical-reduction nickel-phosphorus deposition began spontaneously, with zinc already being co-deposited. In this phase the layer was a light anthracite color. After a short time graphite electrodes were introduced into the bath, with the workpiece connected as the cathode and the electrodes as the anode. The ratio of the projected workpiece area to the anode area in the electrolyte was 1:1 (with a deviation of +/−50%). An auxiliary field was applied on the electrodes, establishing a final current density of 0.1-0.33 $A/dm^2$ (field strength relative to the workpiece surface area, voltage from 1 V to 3.5 V). The auxiliary electric field was adjusted in increasing steps up to the final field strength, the steps being selected between 0.5 V and 1 V, with a dwell time per step between 30 s and 5 minutes, e.g. 1 V/1 min; 2 V/1 min, 3 V/2 min; 3.5 V/4 min. A deep-black layer was obtained on the workpiece.

The layer has electrical and thermal conductivity and is heat-resistant to above 250° C.

Moreover, the layer obtained is acid-resistant, and is in particular resistant to hydrochloric acid.

The black coloring can be attributed to the incorporation of zinc. This can be demonstrated by treatment with a post-dip solution (e.g. Slotopas ZN 301/2, Schötter company) based on Cr(III), which is suitable for the treatment of Ni/Zn coatings. For the layers according to the invention, it shows a definite reaction, which indicates incorporation of Zn.

The layers according to the invention show no color change after 48 h in a salt-spray test.

LITERATURE CITED

U.S. Pat. No. 2,844,530
US 2006/0228569 A1
GB 1 222 969 A

The invention claimed is:

1. A method for depositing a nickel-metal layer on a workpiece, comprising the following steps:
   a) disposing the workpiece in a nickel bath containing ionic nickel and a second ionic metal; and
   b) depositing the nickel-metal layer on the workpiece by simultaneous
      b1) electroless deposition of nickel by reduction of the ionic nickel from the nickel bath onto the workpiece and
      b2) voltage-supported deposition, having a current density, of a second metal by reduction of the second ionic metal from the nickel bath onto the workpiece;
      b3) wherein the current density is increased in a plurality of successive steps from a first voltage to a second, higher voltage.

2. The method as claimed in claim 1,
wherein the nickel bath further comprises a phosphorus compound or a boron compound; and
wherein the method further comprises a simultaneous step of:
   b4) electroless deposition of phosphorus or boron by reduction of the phosphorus compound or the boron compound from the nickel bath onto the workpiece.

3. The method as claimed in claim 1, wherein the voltage-supported deposition is carried out at a temperature above 50° C.

4. The method as claimed in claim 1, wherein the second ionic metal comprises ionic zinc.

5. The method as claimed in claim 1, wherein the second ionic metal is present in the bath in a range between 0.05 mol/l and 0.5 mol/l relative to the ionic nickel.

6. The method as claimed in claim 1, wherein a graphite electrode is used for the voltage-supported deposition.

7. The method as claimed in claim 1, wherein the bath additionally contains at least one conducting salt.

8. The method as claimed in claim 1, wherein the current density is between 0.01 and 5 $A/dm^2$, inclusive.

9. The method as claimed in claim 1, further comprising performing before step b) a step of electroless deposition of nickel by reduction of the ionic nickel from the nickel bath onto the workpiece.

10. The method as claimed in claim 1, wherein each step of the plurality of successive steps corresponds to a voltage increase of 0.1-5 V, and wherein a dwell time per step is between 30 seconds and 15 minutes.

11. The method as claimed in claim 10, wherein each step in the plurality of successive steps corresponds to a voltage increase of 0.5-1 V.

* * * * *